No. 694,249. Patented Feb. 25, 1902.
O. W. & M. L. BUDD.
PLOW.
(Application filed July 8, 1901.)
(No Model.)

Witnesses
Edwin G. McKee
Harry Schmidt

Inventors
Otis Wayne Budd
Melvin Leroy Budd

By Victor J. Evans
Attorney

THE NORRIS PETERS CO., PHOTO-LITHO., WASHINGTON, D. C.

UNITED STATES PATENT OFFICE.

OTIS WAYNE BUDD AND MELVIN LEROY BUDD, OF WESTERVILLE, OHIO.

PLOW.

SPECIFICATION forming part of Letters Patent No. 694,249, dated February 25, 1902.

Application filed July 8, 1901. Serial No. 67,540. (No model.)

*To all whom it may concern:*

Be it known that we, OTIS WAYNE BUDD and MELVIN LEROY BUDD, citizens of the United States, residing at Westerville, in the county of Franklin and State of Ohio, have invented new and useful Improvements in Plows, of which the following is a specification.

This invention relates to plows, and more particularly to a harrow attachment therefor; and the primary object is to provide a simple attachment which may be readily applied and removed without materially changing the construction of the ordinary plow.

A further object is to provide means for bearing down and turning under green crops and dead weeds or corn-stubble as it is turned by the plowshare.

Other objects, as well as the peculiar construction of the invention, will be specifically described hereinafter and finally recited in the claims.

Figure 1:
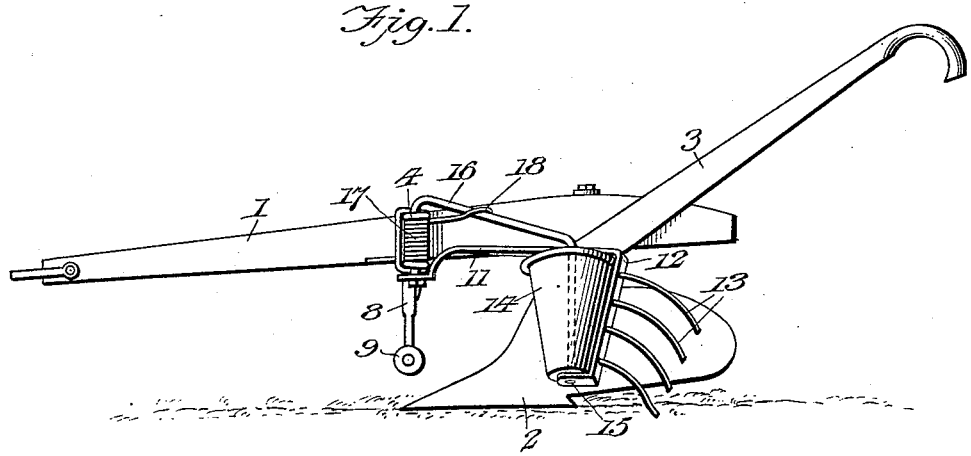
Figure 2:
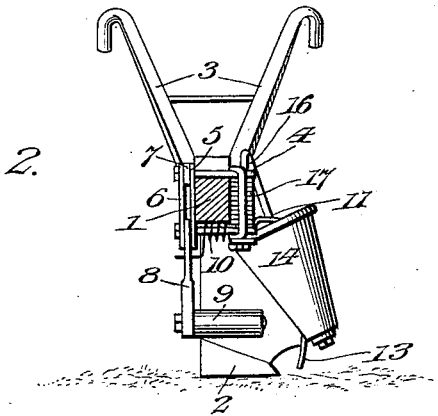

In the drawings, Figure 1 is a side elevation of a plow to which the invention is applied; and Fig. 2 is a front elevation of the invention, the plow-beam being shown in section.

Referring now to the drawings, 1 designates a plow-beam on which is secured the plow-share 2 and the handles 3, all of ordinary construction. Intermediate the ends of the beam 1 is a clip 4, secured to said beam by a plate 5 and a similar plate 6, spaced apart at the top by a nut 7, and the lower ends of the plates are spaced apart by a pivoted arm 8, carrying a right-angularly-disposed roller 9, arranged adjacent the plow-point. The arm and incidentally the roller are normally held in a vertical position by a coil-spring 10. As the plow moves forward the weeds will be pressed upon by the roller 9, and any tendency to a horizontal movement of the arm will be retarded by the spring 10. Of course sufficient play will be permitted to allow the roller to pass over any unusual obstruction, such as large clods or rocks. Carried by the clip and extending rearwardly to a point intermediate the ends of the shear and to one side thereof is an arm 11, having a yoked-shaped extension 12. A plurality of inwardly-curved teeth 13 are carried by the extension 12 and are for the purpose of pushing weeds and stubble to bottom of furrow as they pass from under the feed-roll 14. This feed-roll is in the form of a frustum of a cone and rotates on an axle 15, provided with an upwardly-projecting extension or arm 16, carried by the clip.

17 designates a coil-spring secured to the side of the beam and having the branch 18 thereof to press against the arm 16 to normally force the feed-roll 14 and the yoked extension 12 adjacent the shear. Inasmuch as the arm 11 and the arm 16 are pivoted, the feed-roll 14 and the harrow-teeth will be permitted to have a side play, whereby rocks, &c., may pass through between the roll and the shear.

While we have specifically described in detail what to us at this time appears to be the very best form of our invention, we would have it understood that we reserve the right to make such slight changes and alterations as would suggest themselves from time to time without affecting the scope or departing from the spirit of our invention.

Having thus fully described our invention, what we claim, and desire to secure by Letters Patent, is—

1. In a device of the character described, the combination with a plow, of a harrow attachment carried thereby comprising a spring-pressed pivoted arm secured to the beam, harrow-teeth on the end of said arm, and a feed-roll also carried by the arm.

2. In a device of the character described, the combination with a plow, of a harrow attachment carried thereby comprising a spring-pressed pivoted arm, harrow-teeth carried by said arm, a feed-roll also carried by the arm in the shape of a frustum of a cone, and a pivoted roll adjacent the first-named roll.

3. In a device of the character described, the combination with a plow, of a rearwardly-extending arm carried thereby, a yoke-shaped extension on said arm, teeth projecting from said extension, a feed-roll carried by said extension and means carried by the beam for exerting a downward pressure on the weeds adjacent the plow-point.

4. In a device of the character described, the combination with a plow, a harrow attachment carried by the beam thereof comprising a spring-pressed rearwardly-extending arm, harrow-teeth, a pivoted arm arranged adjacent the first-named arm and extending vertically, and a roller carried by the last-named arm.

In testimony whereof we affix our signatures in presence of two witnesses.

OTIS WAYNE BUDD.
MELVIN LEROY BUDD.

Witnesses:
HARRY B. LEWIS,
FRANCIS M. RAUCK.